United States Patent [19]

Thiel

[11] Patent Number: 4,720,995

[45] Date of Patent: Jan. 26, 1988

[54] METHOD OF DETERMINING THE VOLUME OF A SECTION OF AN UNDERGROUND CAVITY

[75] Inventor: William R. Thiel, Bartlesville, Okla.

[73] Assignee: Phillips Petroleum Company, Bartlesville, Okla.

[21] Appl. No.: 849,662

[22] Filed: Apr. 9, 1986

[51] Int. Cl.$^4$ .............................................. G01F 17/00
[52] U.S. Cl. .............................................. 73/149
[58] Field of Search ................ 73/149, 151, 155, 40.7

[56] References Cited

U.S. PATENT DOCUMENTS

| | | | |
|---|---|---|---|
| 2,792,708 | 5/1957 | Johnston, Jr. et al. | 73/149 |
| 2,972,050 | 2/1961 | Allen | 73/151 |
| 3,059,469 | 10/1962 | Caldwell | 73/149 |
| 3,357,245 | 12/1967 | Wolfrum | 73/290 |
| 4,455,869 | 6/1984 | Broussard et al. | 73/151 |
| 4,523,453 | 6/1985 | Faul et al. | 73/40.7 |
| 4,620,439 | 11/1986 | Faul et al. | 73/40.7 |
| 4,624,130 | 11/1986 | Faul et al. | 73/40.7 |

OTHER PUBLICATIONS

Beasley, R. R., "Strategic Petroleum Reserve (SPR) Oil Storage Cavern Sulphur Mines 2-4-5 Certification Tests and Analysis", Sandia Report SAND81-2070, Sandia National Laboratories (Dec. 1982).

Beasley, R. R., "Strategic Petroleum Reserve (SPR) Oil Storage Cavern Sulfur Mines 7 Certication Tests and Analysis", Sandia Report SAND81-2069, Sandia National Laboratories (May 1982).

Goin, K. L., "Strategic Petroleum Reserve Oil Storage Cavern West Hackberry 6 Recertification Tests and Analysis", Sandia Report SAND82-0543, Sandia National Laboratories (Mar. 1982).

Beasley, R. R., "Strategic Petroleum Reserve (SPR) Oil Storage Cavern Sulphur Mines 6 Certification Test and Analysis", Sandia Report SAND81-2068, Sandia National Laboratories (Apr. 1982).

Primary Examiner—Stewart J. Levy
Assistant Examiner—Robert R. Raevis
Attorney, Agent, or Firm—William R. Sharp

[57] ABSTRACT

A method of determining the volume of a test fluid injected into a section of an underground cavity, and thereby also the volume of the section, utilizes pressurization data with respect to another fluid, such as brine, to derive a compressibility ratio according to one aspect of the invention which is used in conjunction with brine pressure values measured during test fluid injection to determine the cavity section volume.

16 Claims, 4 Drawing Figures

METHOD OF DETERMINING THE VOLUME OF A SECTION OF AN UNDERGROUND CAVITY

BACKGROUND OF THE INVENTION

This invention relates to a method for determining the volume of a section of an underground cavity such as an underground storage cavern.

Liquefied petroleum gases such as butane or propane are sometimes stored in underground caverns located hundreds of feet below the ground. These caverns are most typically formed by first lowering a tube down a borehole and then passing a flow of water through the tube so as to exit the lower end of the tube and circulate through salt deposits. This dissolves the salt so as to gradually carve out the cavern. A large amount of brine (substantially saturated salt solution) results, several times the volume of the cavern, some of which fills the cavern and the borehole and the remainder of which is passed to a brine pond. A fluid desired to be stored in the cavern is simply passed into the borehole so as to form an interface between the fluid and the brine so that the interface moves progressively downward as fluid is injected. Brine is consequently urged upward through the above-mentioned tube, which remains in the cavern after the cavern's formation, and into a brine pond.

One serious problem in storing fluids such as liquefied hydrocarbons in a storage cavern is the potential for leakage of the stored fluid into the surrounding formation which can lead to contamination of water deposits from which drinking water is pumped. Consequently, the United States Environmental Protection Agency and various states have required that caverns for storing certain specified hydrocarbons be tested for "mechanical integrity". In other words, th caverns must be tested to determine the rate of leakage therefrom. Such testing usually involves injection of a test fluid such as nitrogen into a brine-full cavern so as to form an interface between the brine and the nitrogen which is positioned somewhat below the bottom of the borehole. The borehole is then appropriately capped and the interface observed over a period of time, typically about two days. Any rise in the interface indicates leakage of nitrogen into the surrounding formation, which in most instances occurs in the vicinity of the casing shoe at the bottom of the borehole or through the casing. Thus, when the interface rises from a lower level to an upper level where the levels define the upper and lower boundaries of a particular cavern section, the volume of this section must be known in order to determine the volume of test fluid which has leaked into the surrounding formation. Prior methods of determining the volume of cavern sections suffer from many disadvantages and give rise to many of the problems and inaccuracies associated with mechanical integrity testing of caverns.

According to one prior method, which is described in U.S. Pat. Nos. 4,455,869 of Broussard et al and 4,523,453 of Faul et al, liquid nitrogen from a tank is vaporized and injected into a cavern. The nitrogen so injected is weighed by weighing the liquid nitrogen tank during the injection process and monitoring the decrease in weight of the tank. Thus, the weight of the nitrogen injected in moving the brine-nitrogen interface from the upper level of a particular cavern section to the lower level of the section is known. By utilizing this weight and the temperature and pressure of the nitrogen, the volume that the injected nitrogen occupies in the section, and thus the volume of the cavern section, can be determined. This method involves a complex, time-consuming set of calculations along with expensive and complex equipment for weighing the liquid nitrogen tank. In addition, inaccuracies are introduced into the final results due to the necessary assumption of cavern temperature.

According to another prior method, called sonar calipering, a sonar tool is lowered into the cavern to acoustically determine the dimensions of the cavern. Although this method gives reasonably accurate results, it requires that the tubing extending into the cavern be withdrawn before testing can be done. Withdrawal of this tubing (and subsequent replacement) is an expensive operation, typically costing between $20,000 and $40,000.

SUMMARY OF THE INVENTION

It is, therefore, an object of the invention to provide a method of determining the volume of a section of an underground cavity which gives accurate results but is inexpensive and relatively simple to carry out.

The above object is realized in a method which comprises (a) filling a cavity with a first fluid; (b) pressurizing the cavity by injecting further first fluid until a predetermined first fluid pressure is reached; (c) measuring the total volume of first fluid injected into the cavity and also measuring the corresponding first fluid pressure at a plurality of points during the pressurizing step to yield a set of volume-pressure data pairs, wherein each data pair includes a volume V and a corresponding first fluid pressure value P; (d) fitting a linear mathematical function relating V and P to the set of data pairs; (e) injecting a second fluid into the cavity after the pressurizing step so as to form an interface between the first fluid and the second fluid, the interface being moved from a first level to a second level, a section of the cavity defined between the levels being occupied by second fluid at the completion of this step; (f) measuring the first fluid pressure when the interface is at the first level and also the first fluid pressure when the interface is at the second level; and (g) determining the volume of the second fluid occupying the cavity section, and thus the volume of the section, by utilizing the first fluid pressure values and the mathematical function.

According to another aspect of the invention, a method is provided which comprises steps substantially similar to steps (a)-(c), (e) and (f) described above, and wherein a compressibility ratio is derived from the set of data pairs and wherein the volume of a cavern section is determined on the basis of the compressibility ratio and first fluid pressures corresponding to the two interface levels.

According to a preferred embodiment, the invention is employed to determine the volume of a section of an underground storage cavern wherein the first fluid is brine and the second fluid is gaseous nitrogen.

The method of the invention requires a minimum of equipment such as pressure measurement units, pumps, and tanks, and does not require that any tubing in the cavern be withdrawn. Therefore, the method is quite inexpensive as compared to the above described prior methods. Furthermore, the present method is accurate, requires only simple monitoring of pressures and interface positions, involves a minimum of mathematical calculations, and additionally can utilize any test fluid (i.e., nitrogen) without any change of equipment which

3 would be the case, for example, with the nitrogen weighing method.

DESCRIPTION OF THE PREFERRED EMBODIMENTS

An embodiment of the present invention will now be described with reference to the FIGURES. Although the method described is in terms of an underground storage cavern, it should be understood that the method could be applied to any underground cavity.

Figure 1:
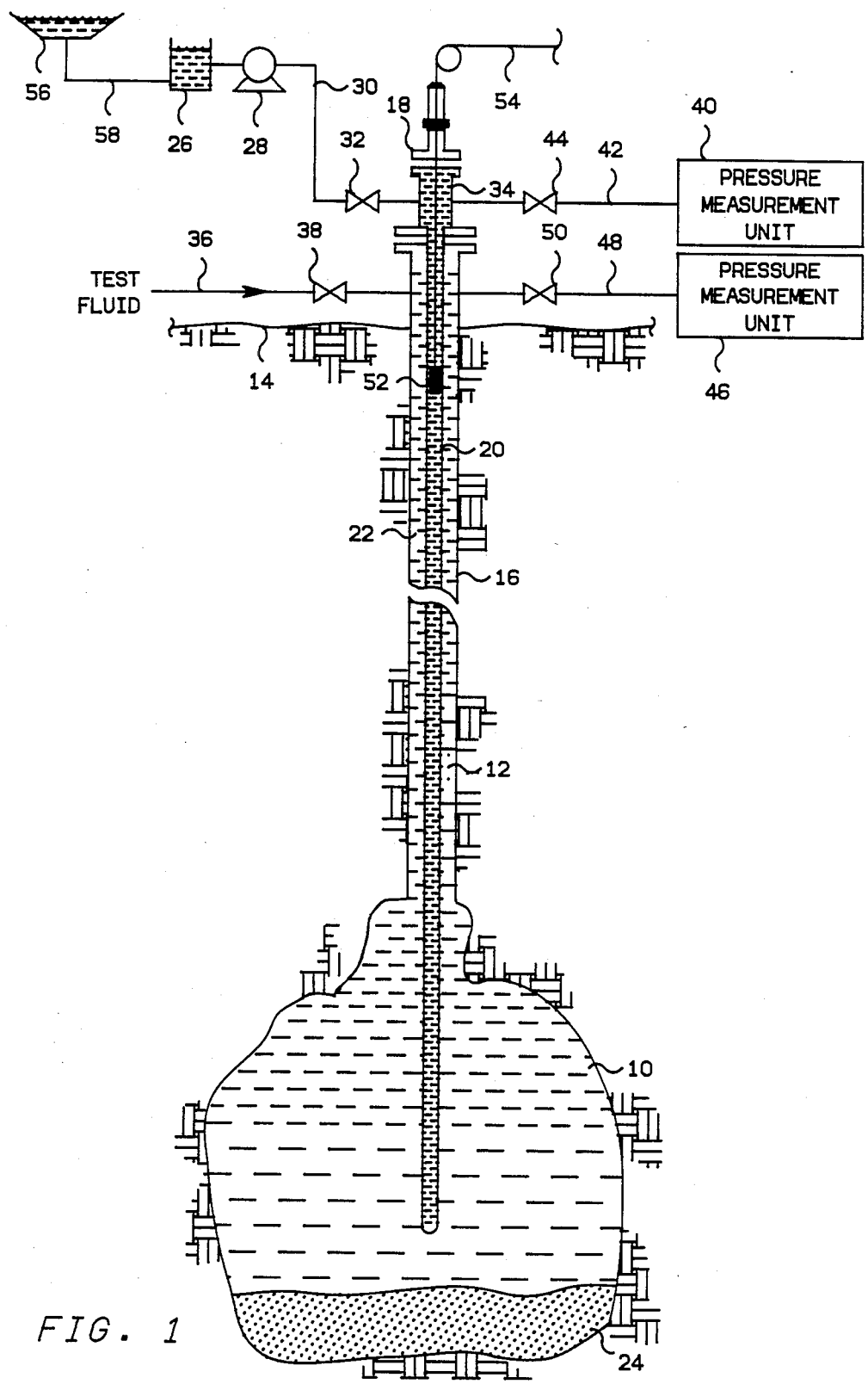
FIG. 1 is a schematic illustration of a brine-full storage cavern and associated equipment for carrying out the present method.

Referring to FIG. 1, which is not drawn to scale, there is shown an underground storage cavern 10 which has a typical volume of about 300,000–4,000,000 bbls., a height of about 300 to about 1,000 ft. and a diameter of about 100–200 ft. A borehole 12 extends from the top of cavern 10 to the earth's surface 14. A casing 16 is provided in the borehole so as to extend from the bottom of the borehole to an above-ground wellhead shown generally at 18. A tube 20 extends from the wellhead 18 through borehole 12, forming an annulus 22 between tube 20 and casing 16, to a lower open end which lies near the bottom of cavern 10. As shown, a layer of insoluble material 24 lies at the bottom of the cavern. This material is deposited during the leaching of the cavern from salt deposits which may contain, in addition to salt, some insoluble material.

Other illustrated equipment for performing the method of the invention includes a metering tank 26 which preferably includes marks from which the volume of fluid in the metering tank can be easily read; a pump 28; a line 30, having a valve 32 associated therewith, which extends between pump 28 and a wellhead spool section 34 which communicates with tube 20; a line 36, having a valve 38 associated therewith, which is in communication with annulus 22 and which functions to introduce a test fluid to the annulus; a pressure measurement unit 40 which is in communication with spool section 34 through line 42 and associated valve 44; pressure measurement unit 46 which communicates with annulus 22 by means of line 48 and valve 50; and a fluid interface detector 52 which is suspended by an electric wire line 54. Also shown is a pond 56 from which brine according to the preferred embodiment can be pumped by a means not shown through line 58 into metering tank 26.

Each of pressure measurement units 40 and 46 are preferably dead weight testers with accuracies and resolutions of at least 0.5 psi and preferably 0.1 psi and of the type which include a piston and cylinder arrangement wherein weights are used to counterbalance the piston with respect to the fluid pressure being measured. These types of pressure testers are preferred because of their accurate and consistent pressure readings. However, any pressure gauge or pressure transducer can be used in accordance with the invention providing such a gauge or transducer is capable of giving acceptably accurate and consistent pressure readings. It is even sometimes necessary to use a conventional gauge or transducer for pressure measurement unit 46 as will be explained further below.

Interface detector 52 is preferably a density detection/collar locator tool which detects variations in density outside of tube 20 by emitting gamma radiation from one position on the tool which is received at a different position on the tool. If a fluid interface moves from below or above the tool to a position between the receiver and emitter, this position of the interface will be detected as a variation in the gamma radiation received by the receiver. Of course, any type of interface detector is within the scope of the present invention. Two service companies which have such tools and provide interface detection services are French Well Surveys, Inc., Houston, TX, and Micro Gage, Inc., Pearland, TX.

A preferred embodiment of the method according to the invention will now be described. First, brine from brine pond 56 is passed through line 58 so as to fill metering tank 26. Brine is withdrawn from metering tank 26 by pump 28 and passed through line 30 into the spool section 34 of wellhead 18 until the cavern and borehole are brine-full at 0 psig. During such an operation metering tank 26 can receive brine continuously from pond 56 or alternatively, a pair of tanks can be employed where one tank is filled and is then emptied while the other tank is being filled and prepared for withdrawal of brine therefrom.

After the filling operation, further brine is introduced into the borehole and cavern in a similar manner to pressurize the cavern to a predetermined pressure somewhat less than the mechanical integrity test pressure. Typically, the pressure to which the brine is pressurized at this point of the method is about 80 percent of the brine pressure utilized during a mechanical integrity leakage test (but this will vary depending upon particular cavern depth and size). The total volume of brine injected into the borehole and cavern in the pressurizing operation is measured and appropriately monitored at a plurality of points, typically about 30 to about 50, during pressurization. This is most conveniently done with the aid of volume marks on metering tank 26 whereby the volume of brine withdrawn from metering tank 26 is visually monitored utilizing the marks. As in the filling operation, a pair of metering tanks can be used during pressurization for convenient and continuous injection of brine into the borehole. As a result of the volume measurements a plurality of volume values will be obtained ranging from a first value near 0 to the highest and last measured volume value which corresponds to the total volume of brine injected into the borehole from the beginning to the end of pressurization. It should be apparent that any technique can be used for measuring the volume of brine injected such as counting the strokes of a positive displacement pump or by metering the flow of brine into the borehole.

Also during pressurization, pressure measurement unit 46 is employed to measure the brine pressure at the wellhead at each of the plurality of points during pressurization at which volume is measured. Of course, valve 50 is open during pressurization as well as valve 32. Valves 38 and 44 are closed.

Brine pressure in annulus 22 is measured during pressurization so that static pressure is monitored, rather than introduce a possible error by measuring dynamic pressure with pressure measurement unit 40. Alternately, piping could be configured so brine is injected into annulus 22 and static brine pressure could then be measured by pressure measurement unit 40.

Although the method of the invention has been described as utilizing brine thus far, it should be understood that other fluids can be employed which will not tend to dissolve the deposits around the cavern so as to enlarge the cavern. Possible alternative fluids include hydrocarbon liquids such as crude oil, diesel oil, natural gas liquids, and any of various liquids which are convenient and compatible with cavern conditions.

Figure 2:
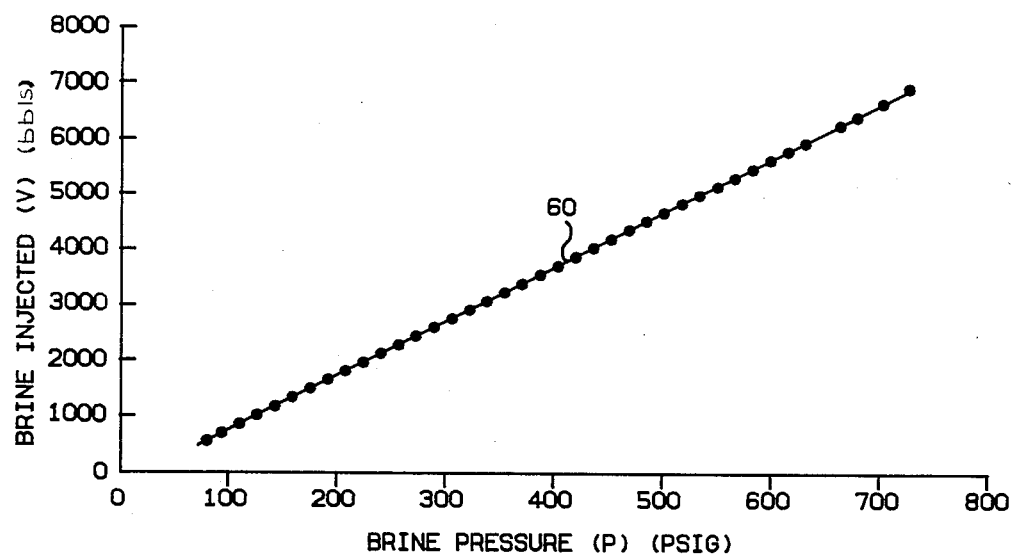
FIG. 2 is a plot of a set of data pairs as described above and a line fitted to the set of data pair points.

After the pressure and volume measurements during pressurization, a set of volume-data pairs are obtained, wherein each data pair includes a volume value V and a corresponding brine pressure value P. Referring to FIG. 2, a graph is shown with a vertical axis corresponding to brine injected in barrels and a horizontal axis corresponding to brine pressure in psig. A set of such data pairs are plotted on the graph in accordance with an example later described. As shown, the brine pressure linearly increases as the volume of brine injected increases.

A linear mathematical function relating V and P is fitted to the set of data pairs utilizing least squares fitting or any other appropriate fitting technique. Thus, a linear function is derived of the general form $$V = CP + b, \quad (1)$$

where C is the slope of the line which is hereafter denoted as the compressibility ratio (a constant) and where b is the vertical (V) axis intercept. An example of a line fitted to a set of data pair points is shown at 60 in FIG. 2.

The compressibility ratio C, or slope of the line, can be expressed from elementary mathematics ("rise/run") as $$\Delta V / \Delta P = C, \text{ or} \quad (2)$$

$$\Delta V = C \Delta P \quad (3)$$

where $\Delta V$ is the difference in volume values of any two respective data pairs and $\Delta P$ is the difference of the corresponding pressure values. Equation (2) can also be derived by combining an equation of the form in (1) corresponding to one data pair with another equation from (1) corresponding to another data pair. Thus, equation (3) essentially says that any change in brine volume injected into the cavern is proportional to the corresponding pressure rise.

After pressurization, the brine in the borehole and cavern is allowed to stabilize with respect to temperature for about 24 to about 48 hours before proceeding with the additional steps of the method. The temperature of the brine injected into the cavern will vary seasonally and must be allowed to stabilize to the average temperature of the cavern of about 100° F. so as to avoid any gross imbalances in equilibrium which could lead to erroneous results later on in the course of the test.

After the set of data pairs are obtained as described above, a test fluid is injected through line 36 and open valve 38 into annulus 22. It is necessary in accordance with the invention that this test fluid form an interface between it and the brine or other fluid which is employed. In this regard, it is desirable that the test fluid is less dense than and immiscible with the brine. If a density interface detector is used, the fluids of course should have different densities to enable interface detection. Although nitrogen gas is generally preferred as the test fluid, since it is readily available, inert and noncorrosive with respect to the borehole casing, other test fluids such as propane, butane and natural gas can be employed according to the invention so long as an interface is formed between the test fluid and the brine. Air could also be used as the test fluid but is generally not preferred due to its tendency to result in combustible combinations and due to its tendency to assist in the corrosion of the casing. When nitrogen is used as the test fluid, the nitrogen is most conveniently supplied in liquid form from a tank not shown from which liquid nitrogen is withdrawn and vaporized in a suitable heat exchanger. The nitrogen gas is preferably heated to the approximate temperature of the cavern, typically about 100° F., so that no gross temperature changes are introduced in the environment of the cavern which would cause a change in fluid interface level, later described, which could lead to erroneous results.

Figure 3:
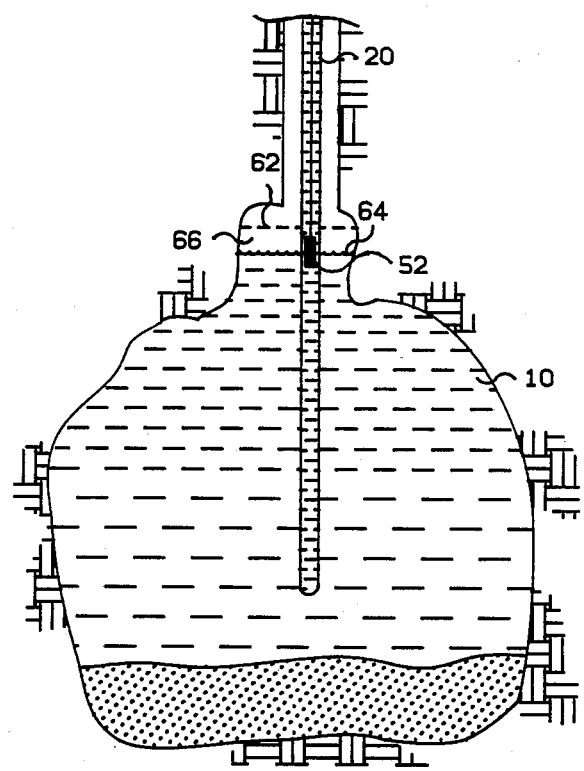
FIG. 3 is a schematic illustration of the cavern at a point in the present method wherein a fluid interface lies just below the top of the cavern.

The test fluid is injected continuously or intermittently so as to move the brine/test fluid interface down the borehole. Once the interface enters the cavern (below the bottom of casing 16), test fluid injection should either be accomplished in stages, or at a rate slow enough such that errors are not introduced due to test fluid momentum (300 standard cubic feet per minute or less when the test fluid is nitrogen). During this movement of the interface in the annulus, pressure measurement unit 46 can be employed to measure the test fluid pressure in annulus 22 in which case a pressure measurement unit such as a pressure gauge or transducer may be preferable over a dead weight tester due to the rapid change in pressure while the interface is moving down the borehole. This data is not used for the present method but can be used for other purposes. The injection of the test fluid is continued so as to move the interface into the cavern 10. Referring to FIG. 3, the interface is shown as being moved from an upper level shown in dashed lines at 62 to a lower level shown at 64. The method will hereinafter be described only with respect to annular cavern section 66 wherein the upper and lower levels 62 and 64 define the upper and lower boundaries of section 66 and wherein the section is defined between the tube and the cavern wall. It should be understood, however, that the method in actual practice is applied to a number of adjacent cavern sections. Interface detector 52 is lowered to the position of level 62 before the interface reaches this level. When the interface reaches level 62, the detector will indicate this. Interface detector 52 is shown in FIG. 3 as being at the lower level 64 to which it is lowered after detection of the interface at level 62. Similarly, the interface at level 64 is detected. Typically, the distance $\Delta L$ between the levels is about 6 inches to about 1 foot (but $\Delta L$ can vary depending on desired test objectives and cavern geometry).

Employing pressure measurement unit 40, the brine pressure at the wellhead is measured when the interface is at the upper level 62 to yield a pressure value hereinafter designated as $P_1$, and the brine pressure is also measured when the interface is at level 64 to yield a pressure value $P_2$. Note in regard to these pressure measurements that the brine extends in FIG. 3 up the tube 20 to the top of the wellhead. It should also be noted that pressure may be measured at locations in the brine other than the wellhead. However, measurement at the wellhead is most practical and convenient.

Since the brine pressure response is substantially identical regardless of the fluid injected, equation (3) can be used to determine the volume of test fluid injected into cavern section 66 between levels 62 and 64. Accordingly, $$\Delta V = C(P_2 - P_1) = C\Delta P. \quad (4)$$

where $\Delta V$ is the volume of test fluid present in annular cavern section 66 between levels 62 and 64 after the interface is moved to level 64 so as to also give the volume of section 66. Therefore, the volume of cavern section 66 is a function of the brine pressure rise resulting from movement of the interface from upper level 62 to lower level 64. For most accurate results, it is desirable that the volume of test fluid in the borehole and cavern is small compared with the volume of brine after test fluid injection. More specifically, the test fluid volume is preferably less than about 1% of the brine volume, and is most preferably less than about 0.1% of the brine volume.

Once the volume of section 66 is known, a volume profile of this section can be determined from $$\Delta V / \Delta L \quad (5)$$

where $\Delta L$ is the distance between levels 62 and 64 where distance is measured along a line parallel to the direction of movement of the interface. The volume profile $\Delta V/\Delta L$ can be expressed, for example, as bbls./ft.

In a similar manner to that discussed above, volumes $\Delta V$ and volume profiles $\Delta V/\Delta L$ can be determined for cavern sections below and/or above cavern section 66 from brine pressure data corresponding to different interface levels as the interface moves down the cavern.

Figure 4:
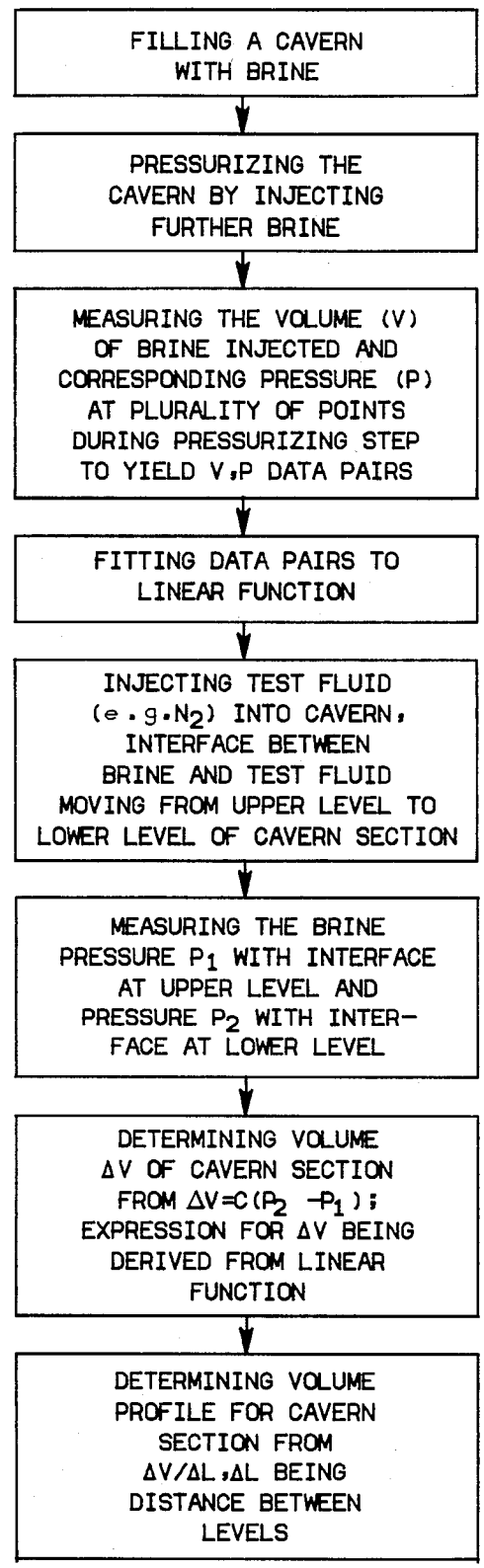
FIG. 4 is a flow chart outlining the various steps of a preferred embodiment of the present method.

A flow chart outlining the various steps of the preferred embodiment of the invention as described above is shown in FIG. 4.

Injection of test fluid is terminated when the test fluid pressure as measured by pressure measurement unit 46 reaches the desired test fluid pressure for mechanical integrity testing and the interface is at the desired depth. The desired test pressure is calculated such that the pressure of the test fluid at the casing shoe is equal to or greater than the maximum allowed during storage operations (typically about 0.78 psi/ft. times the depth of the casing shoe at the bottom of the borehole casing 16).

To test for leakage, the interface is observed over a period of time, typically about two days, to see if the interface rises. Such a rise in interface indicates leakage of the test fluid into the surrounding formation. The distance which the interface rises in any particular cavern section can be multiplied by the corresponding volume profile $\Delta V/\Delta L$ to give the volume of test fluid which has leaked from the cavern. Therefore, during the mechanical integrity test, the rate of leakage of the test fluid can be determined.

An example will now be described to further illustrate the invention but which should not be construed to limit the invention in any manner.

The method of the invention was applied to an underground storage cavern formed within a salt dome. The cavern has approximate overall dimensions as follows: a total volume of about 3.8 million barrels, a height of about 1000 feet, and an average diameter of about 165 feet. A vertical borehole extends from the surface to the top of the cavern, and has a casing (13⅜ inches O.D.) therein which extends from the surface to a casing shoe at a depth of 2818 feet adjacent the top of the cavern. A brine tube (7⅝ inches O.D.) extends through the casing and cavern from an upper end at the wellhead to a lower end near the cavern bottom.

The cavern was filled and pressurized with brine in accordance with the invention. The volume of brine injected during pressurization was measured using appropriately marked tanks and the brine pressure was measured at the wellhead using a dead weight tester using an arrangement substantially as shown in FIG. 1. A set of volume-pressure data pairs resulted which are set forth in Table I.

TABLE I

| P(psi) | V(bbls.) | P(psi) | V(bbls.) | P(psi) | V(bbls.) |
|---|---|---|---|---|---|
| 82 | 570 | 293.5 | 2610 | 504 | 4690 |
| 98 | 730 | 309.5 | 2770 | 519.5 | 4850 |
| 115 | 890 | 326 | 2930 | 535.5 | 5010 |
| 131.5 | 1050 | 342 | 3090 | 551.5 | 5170 |
| 148.5 | 1210 | 358.5 | 3250 | 568 | 5330 |
| 160.5 | 1330 | 374 | 3410 | 584 | 5490 |
| 177 | 1490 | 390.5 | 3570 | 600 | 5650 |
| 193 | 1650 | 406.5 | 3730 | 615 | 5810 |
| 209.5 | 1810 | 423.5 | 3890 | 631 | 5970 |
| 227 | 1970 | 440 | 4050 | 661.5 | 6290 |
| 243.5 | 2130 | 456 | 4210 | 678 | 6450 |
| 260.5 | 2290 | 472 | 4370 | 704 | 6730 |
| 277 | 2450 | 488 | 4530 | 729 | 7013 |

The above data pairs are plotted in FIG. 2. A linear function was fitted to the data pairs to yield the following linear function:

$$V = -272.141 + 9.88265 P. \quad (6)$$

This line is shown at 60 in FIG. 2. From (6), the compressibility ratio C (slope) can be seen to be 9.88265 bbls./psi.

After pressurization, the cavern was allowed to stabilize for about 24 hours. Nitrogen gas was then injected into annulus 22, the wellhead brine pressure measured at various interface levels, and the interface between the brine and nitrogen detected using a wireline density detection/location tool to yield the following data in Table II, where $L$ = measured depth to nitrogen/brine interface (ft.)
$\Delta L$ = change in interface (ft.)
$P$ = wellhead brine pressure in tube 20 per dead weight tester (psig)
$\Delta P$ = change in wellhead brine pressure
$\Delta V$ = change in volume of nitrogen in annulus (bbls.) defined between brine tube and casing or cavern, as calculated by $\Delta V = \Delta P \times 9.883$ bbls./psi. See equation (4) and (6).
$\Delta V/\Delta L$ = average change in volume (bbls./ft.) or volume profile.
$\overline{D}$ = effective average diameter (ft.) calculated by:

$$\overline{D} = \sqrt{\Delta V/\Delta L \text{ (bbls./ft.)} \times 4/\pi \times 5.615 \text{ ft.}^3/\text{bbl.}}$$

This is not a true diameter as the volume of tube 20 is ignored in this calculation.

TABLE II

| L | ΔL | P | ΔP | ΔV | ΔV/ΔL | $\overline{D}$ |
|---|---|---|---|---|---|---|
| 0 | — | not avail. | — | — | — | — |
| 151 | 151 | 728 | — | — | — | — |
| 1500 | 1349 | 742 | 14 | 138.36 | .10 | .9 |
| 2818 | 1318 | 730½ | 15.5* | 153.19 | .12 | .9 |

TABLE II-continued

| L | ΔL | P | ΔP | ΔV | ΔV/ΔL | D̄ |
|---|---|---|---|---|---|---|
| 2819 | 1.0 | 731 | .5 | 4.94 | 4.94 | 5.9 |
| 2820.0 | 1.0 | 732½ | 1.5 | 14.82 | 14.82 | 10.3 |
| 2821.6 | 1.6 | 734 | 1.5 | 14.82 | 9.27 | 8.1 |
| 2822.8 | 1.2 | 735 | 1.0 | 9.88 | 8.24 | 7.7 |

*Between 1500' and 2818', nitrogen injection was stopped and brine was released to reduce cavern brine pressure by 27 psi. This was accomplished to prevent overpressuring the cavern prior to establishing the interface at the desired depth (pressure had been too high). ΔP therefore equaled: 730½ + 27 − 742 = 15.5 psi for that interval.

For the sake of illustration, it can be seen from Table II that the volume of test fluid occupying the annular section (defined between brine tube and casing) between the 151 ft. level and the 1500 ft. level is 138.36 bbls. Of course, this is also the volume of the this section. Similarly, the volume of the annular section (defined between brine tube and cavern) between the 2821.6 ft. level and the 2822.8 ft. level is 9.88 bbls.

The volume profile ΔV/ΔL is determined above the casing shoe (at 2818 ft. for this example) as a procedural check only to check the accuracy of the method. For example, the average change in volume per foot in the annular section in the casing between the 151 ft. level and the 1500 ft. level is 0.10 bbls./ft. which compares favorably with the known volume profile of 0.09 bbls./ft. with respect to the annulus between the casing and the brine tube.

The diameter values are determined primarily to give one a general idea of the shape of the cavern. The diameters can be used to draw a scaled diagram of the cavern walls.

Thus, there is provided by the present invention a method for determining the volume and volume profile corresponding to any particular section of an underground cavity such as a cavern. The method requires only simple and inexpensive equipment such as pumps, tanks and dead weight pressure testers, involves relatively simple calculations, and is simple to carry out. The desired volume data is obtained easily and directly from measured brine pressures. Also, the method does not require expensive removal of tubing from the cavern, in contrast to sonar techniques. Finally, the present method allows a variety of test fluids to be used without the need to change test equipment.

Obviously many modifications and variations of the present invention are possible in light of the above teachings. It is therefore to be understood that within the scope of the appended claims the invention may be practiced otherwise than as specifically described.

That which is claimed is:

1. A method comprising:
   (a) filling an underground cavity with a first fluid;
   (b) pressurizing the cavity by injecting further first fluid into the cavity after step (a) until a predetermined first fluid pressure is reached;
   (c) measuring the total volume of first fluid injected into the cavity in step (b) and also measuring the corresponding first fluid pressure at a plurality of points during step (b) to yield a set of volume-pressure data pairs, wherein each data pair includes a volume value V and a corresponding first fluid pressure value P;
   (d) fitting a linear mathematical function relating V and P to the set of data pairs;
   (e) injecting a second fluid into the cavity after step (b) so as to form an interface between the first fluid and the second fluid, the interface being moved during said second fluid injection from a first level to a second level, wherein the first and second levels define therebetween a cavity section which is occupied by second fluid at the completion of this step;
   (f) measuring the first fluid pressure when the interface is at the first level and also the first fluid pressure when the interface is at the second level; and
   (g) determining the volume of second fluid occupying the cavity section by utilizing the pressure values measured in (f) and the linear mathematical function of (d), said volume of second fluid also being the volume of the cavity section.

2. A method as recited in claim 1, wherein the second fluid is less dense than and immiscible with the first fluid.

3. A method as recited in claim 2, wherein the first fluid is brine.

4. A method as recited in claim 3, wherein the second fluid is gaseous nitrogen.

5. A method as recited in claim 1, wherein step (g) comprises determining ΔV from $$\Delta V = C(P_2 - P_1) = C\Delta P,$$

where ΔV is the volume of the cavity section, C is the constant slope associated with the linear function and which is denoted as the compressibility ratio, and where $P_1$ is the pressure measured in (f) when the interface is at the first level and $P_2$ is the pressure measured in (f) when the interface is at the second level.

6. A method as recited in claim 5, further comprising the step of determining the volume profile of the cavity section where the volume profile is ΔV/ΔL, ΔL being the distance between the first level and the second level, and where distance is measured along a line parallel to the direction of movement of the interface.

7. A method as recited in claim 1, wherein the cavity is an underground storage cavern.

8. A method as recited in claim 1, wherein the volume of the second fluid present in the cavity is less than about 1% of the volume of the first fluid in the cavity after step (e).

9. A method as recited in claim 1 wherein the pressure measurements in step (c) are taken at a particular location in the first fluid and wherein the pressure measurements in step (f) are taken at said location.

10. A method as recited in claim 9 wherein the cavity is a cavern from which a borehole extends to the surface of the earth, the borehole having a casing therein which extends to an above-ground wellhead, wherein said location is at the wellhead.

11. A method comprising:
   (a) filling an underground cavity with a first fluid;
   (b) pressurizing the cavity by injecting further first fluid into the cavity after step (a) until a predetermined first fluid pressure is reached;
   (c) measuring the total volume of first fluid injected into the cavity in step (b) and also measuring the corresponding first fluid pressure at a plurality of points during step (b) to yield a set of volume-pressure data pairs, wherein each data pair includes a volume value and a corresponding first fluid pressure value;
   (d) deriving a compressibility ratio C from the set of data pairs;
   (e) injecting a second fluid into the cavity after step (b) so as to form an interface between the first fluid and the second fluid, the interface being moved during said second fluid injection from a first level to a second level, wherein the first and second levels define therebetween a cavity section which is occupied by second fluid at the completion of this step;

(f) measuring the first fluid pressure $P_1$ when the interface is at the first level and also the first fluid pressure $P_2$ when the interface is at the second level; and (g) determining the volume $\Delta V$ of second fluid occupying the cavity section after (f), and thereby also the volume of the cavity section, on the basis of the compressibility ratio C and the pressures $P_1$ and $P_2$.

12. A method as recited in claim 11, wherein $$\Delta V = C(P_2 - P_1).$$

13. A method as recited in claim 12, wherein the first fluid is brine.

14. A method as recited in claim 12, wherein the second fluid is gaseous nitrogen.

15. A method as recited in claim 11 wherein the pressure measurements in step (c) are taken at a particular location in the first fluid and wherein the pressure measurements in step (f) are taken at said location.

16. A method as recited in claim 15 wherein the cavity is a cavern from which a borehole extends to the surface of the earth, the borehole having a casing therein which extends to an above-ground wellhead, wherein said location is at the wellhead.

* * * * *